O. M. JANSEN.
TOOL CHUCK.
APPLICATION FILED MAR. 11, 1921.
1,430,556.
Patented Oct. 3, 1922.
2 SHEETS—SHEET 1.
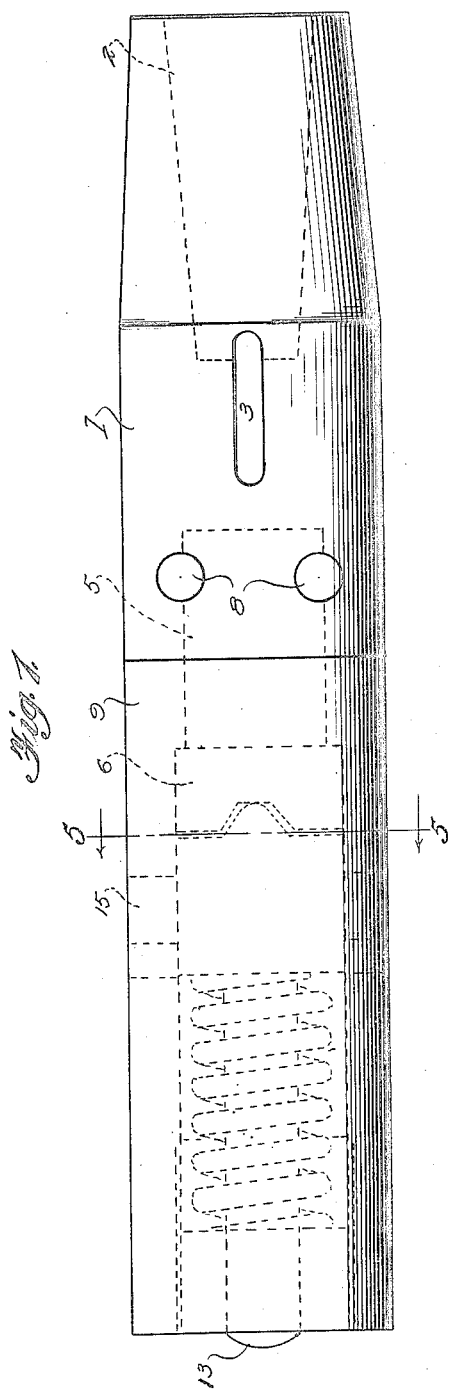
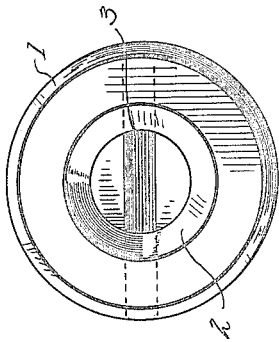
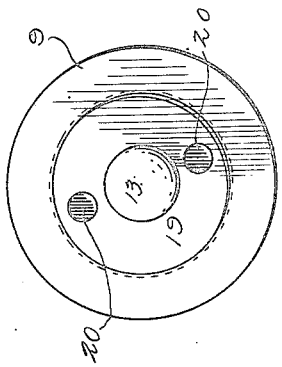
INVENTOR.
Ole M. Jansen.
BY
ATTORNEYS.

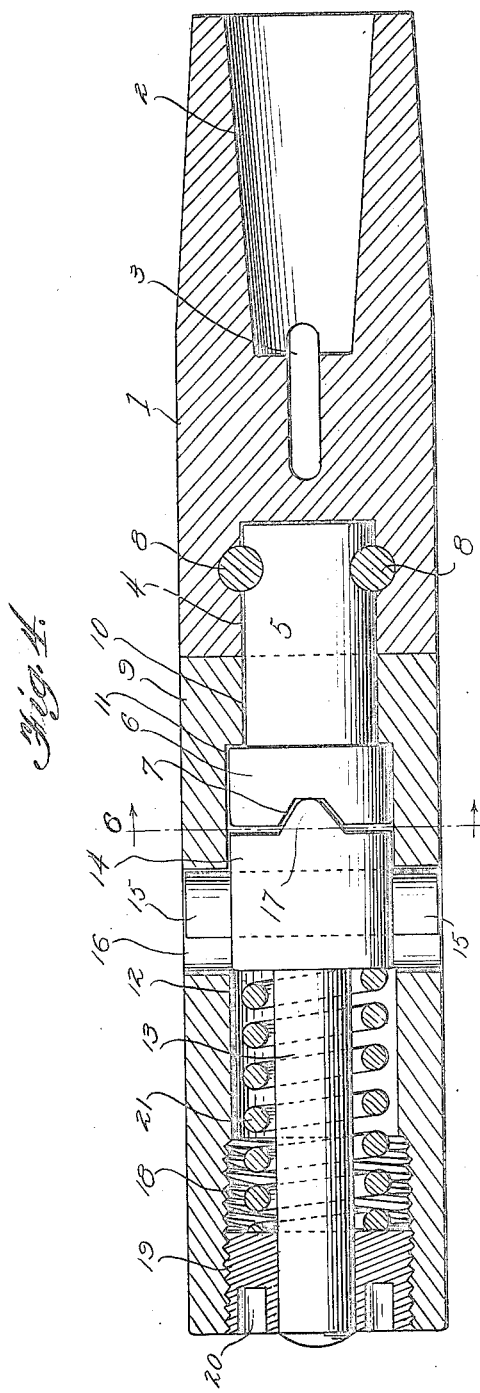
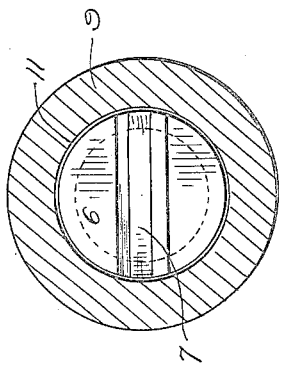
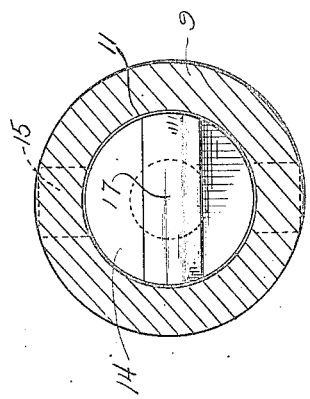

Patented Oct. 3, 1922.

1,430,556

UNITED STATES PATENT OFFICE.

OLE MARTIN JANSEN, OF SEATTLE, WASHINGTON.

TOOL CHUCK.

Application filed March 11, 1921. Serial No. 451,471.

*To all whom it may concern:*

Be it known that I, OLE MARTIN JANSEN, a citizen of the United States, and residing at Seattle, in the county of King and State of Washington, have invented certain new and useful Improvements in Tool Chucks, of which the following is a specification.

This invention relates to an improvement in tool chucks and particularly to a chuck capable of automatic yielding to discontinue the driving action on the tool, in the event the tool encounters an unusual obstruction in action.

The invention provides a chuck made up in two parts mounted for relative rotation and interlocked for ordinary use to insure rotative action of the tool held in one of such parts. The interlock is provided for yielding under undue rotary resistance of the tool carrying part to thereby prevent further driving of such part and the tool as will be if such disconnection is maintained.

In the drawings:—

Fig. 1 is a view in elevation of the improved tool chuck.

Fig. 2 is an end view of the same.

Fig. 3 is an opposite end view of the same.

Fig. 4 is a longitudinal section of the same.

Fig. 5 is a section on line 5—5 of Fig. 1.

Fig. 6 is a section on line 6—6 of Fig. 4.

The improved chuck comprises a main or tool carrying body 1 formed at one end with a recess 2, to receive the tool or other member to be operated, the end of the recess having the usual apertures 3 to cooperate with the tool parts to hold the tool against relative movement. The end of body 1 opposite the tool receiving end is formed with a central depression or channel 4, to receive an interlocking element 5 having a circumferentially enlarged head 6 formed in its free face with a diametrically arranged recess 7 havng inclined side walls. The member 5 is fixed in the body section 1 by taper pins 8 fitting in cooperating recesses in the body and member 5, to hold the member rigid with the body and yet permitting its convenient removal when desired for renewal.

A driving body section 9 having an external diameter corresponding to that of the body 1, is adapted to bear against the end of said body and is formed with a longitudinal bore 10, which at the end of said body 9 in contact with the body 1, is formed to rotatively cooperate with the member 5, the said bore 10 being enlarged at 11 to receive the head of the member 5. By this construction the body portion 9 is secured to the body 1 against endwise separation, while permitting a free relative rotary movement. The bore of the body section 9 beyond the reduced portion 10 is of a diameter corresponding to the enlargement of said bore at 11, this additional bore length 12 receiving a plunger 13 having an enlarged head portion 14 to correspond in diameter with that of the bore. The head has diametrically opposed pins 15 adapted to cooperate with the elongated slots 16 formed in the body, whereby the plunger is permitted a limited longitudinal movement with respect to the body. The cooperating faces of the enlargement 6 of the interlocking member 5 and of the head 14 of the plunger 13 form the interlocking elements for the bodies 1 and 9, and for this purpose the head 14 is formed with a diametrically opposed rib 17 corresponding in size and shape to that of the recess 7 of member 5. The outer or free end of the bore 12 is threaded at 18 to receive an adjusting nut 19 which may be threaded into the bore through the use of a suitable spanner wrench cooperating with holes 20. The shank of the plunger 13 passes freely through the nut 19, and a spring 21 coiled about the shank of the plunger and bearing between the nut and the head 14 of said plunger insures a sufficient interlocking cooperation of the rib 17 and recess 7 to hold the bodies 1 and 9 fixed against relative rotation in ordinary uses.

It is apparent from the construction described that so long as the tool being operated is meeting with the usual resistance only, the interlock will be maintained and the driving element, which is the body 9, will continue to operate the tool. In the event however the tool meets an unusual obstruction which the tension of the spring 21 cannot overcome, the rib 17 will ride out of the recess 7, moving the plunger against the tension of said spring, and the further movement of the body portion 9 will not correspondingly affect the tool.

Through the medium of the nut 19, the spring 21 may be adjusted to provide any desired tension for the interlock to thus regulate the device in accordance with the work being handled.

The structure as a whole is adapted for use in drills, reamers, or other types of machines, and in this use will effectively prevent breakage of the tool incident to an unusual resistance of the tool in operation.

Claims:

1. A tool chuck comprising relatively rotative members, an interlock holding the members against relative rotation, said interlock comprising a spring pressed plunger in one of said members formed with a rib, and an interlocking member in the other of said members formed with a recess to receive the rib, said interlocking member being removably secured within the member with which it cooperates.

2. A tool chuck comprising a body formed at one end to receive the tool, an interlocking member removably secured in the opposite end of the body and having a headed portion to project beyond said end of the body, a second body portion embracing said interlocking member and recessed to receive the head to prevent endwise separation of the body portions, a plunger mounted for limited longitudinal movement in said second body portion, said plunger having an enlarged end to bear on the head of the interlocking member, the meeting ends of the plunger and interlocking member being formed with cooperating rib and recess to lock said portions together, and a spring for resisting endwise movement of the plunger.

3. A tool chuck comprising a body formed at one end to receive the tool, an interlocking member removably secured in the opposite end of the body and having a headed portion to project beyond said end of the body, a second body portion embracing said interlocking member and recessed to receive the head to prevent endwise separation of the body portions, a plunger mounted for limited longitudinal movement in said second body portion, said plunger having an enlarged end to bear on the head of the interlocking member, the meeting ends of the plunger and interlocking member being formed with cooperating rib and recess to lock said portions together, and a spring for resisting endwise movement of the plunger, and means for adjusting the spring.

4. In a tool chuck, the combination of two rotatable hollow body members adapted to be handled as a unit, one of said members adapted to receive tool shanks, the same body member having embedded in its uppermost end a female plug, the end of the said plug forming a bearing for the other of said hollow body members, a reciprocating male plunger slidably mounted within the last mentioned hollow body member and adapted to normally engage the plug, a tension spring for causing such normal engagement, and the tension of said spring being adjustable to the nature of the work.

In testimony whereof I affix my signature.

OLE MARTIN JANSEN.